United States Patent
Lin et al.

(10) Patent No.: US 9,438,911 B2
(45) Date of Patent: Sep. 6, 2016

(54) VIDEO PROCESSING SYSTEM WITH SHARED/CONFIGURABLE IN-LOOP FILTER DATA BUFFER ARCHITECTURE AND RELATED VIDEO PROCESSING METHOD THEREOF

(71) Applicant: MEDIATEK INC., Hsin-Chu (TW)

(72) Inventors: Huei-Min Lin, Hsinchu County (TW); Ping Chao, Taipei (TW); Chi-Cheng Ju, Hsinchu (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 347 days.

(21) Appl. No.: 13/944,893

(22) Filed: Jul. 18, 2013

(65) Prior Publication Data

US 2014/0037017 A1 Feb. 6, 2014

Related U.S. Application Data

(60) Provisional application No. 61/679,276, filed on Aug. 3, 2012.

(51) Int. Cl.
*H04N 19/00* (2014.01)
*H04N 19/80* (2014.01)
*H04N 19/423* (2014.01)

(52) U.S. Cl.
CPC ........ *H04N 19/0089* (2013.01); *H04N 19/423* (2014.11); *H04N 19/80* (2014.11)

(58) Field of Classification Search
CPC ....................... H04L 2012/5679; H04N 19/00
USPC .................................................... 375/240.29
See application file for complete search history.

(56) References Cited

U.S. PATENT DOCUMENTS

| | | | |
|---|---|---|---|
| 5,625,571 A * | 4/1997 | Claydon | ............. G06F 12/0207 348/403.1 |
| 2010/0142623 A1* | 6/2010 | Vaduganathan | ....... H04N 19/86 375/240.25 |
| 2012/0106624 A1 | 5/2012 | Huang | |

FOREIGN PATENT DOCUMENTS

| | | |
|---|---|---|
| CN | 1725860 A | 1/2006 |
| CN | 1972451 A | 5/2007 |
| CN | 101072019 A | 11/2007 |
| CN | 102484714 A | 5/2012 |
| WO | 2011087932 A1 | 7/2011 |

OTHER PUBLICATIONS

"International Search Report" mailed on Oct. 31, 2013 for International application No. PCT/CN2013/080400, International filing date: Jul. 30, 2013.

* cited by examiner

*Primary Examiner* — Jeffery Williams
(74) *Attorney, Agent, or Firm* — Winston Hsu; Scott Margo

(57) ABSTRACT

A video processing system includes a data buffer and a storage controller. The data buffer is shared between a plurality of in-loop filters, wherein not all of the in-loop filters comply with a same video standard. The storage controller controls data access of the data buffer, wherein for each in-loop filter granted to access the data buffer, the data buffer stores a partial data of a picture processed by the in-loop filter. Another video processing system includes a storage device and a storage controller. The storage controller adaptively determines a size of a storage space according to a tile partition setting of a picture to be processed by an in-loop filter, and controls the storage device to allocate the storage space to serve as a data buffer for storing data of the in-loop filter.

24 Claims, 13 Drawing Sheets

VIDEO PROCESSING SYSTEM WITH SHARED/CONFIGURABLE IN-LOOP FILTER DATA BUFFER ARCHITECTURE AND RELATED VIDEO PROCESSING METHOD THEREOF

CROSS REFERENCE TO RELATED APPLICATIONS

This application claims the benefit of U.S. provisional application No. 61/679,276, filed on Aug. 3, 2012 and incorporated herein by reference.

BACKGROUND

The disclosed embodiments of the present invention relate to video encoding/decoding, and more particularly, to a video processing system with shared/configurable in-loop filter data buffer architecture and related video processing method thereof.

In the H.264 standard, a de-blocking filter (DF) placed in the prediction loop is one important tool to increase the coding efficiency and remove the blocking artifacts. For example, the DF process is invoked with four samples of each side of macroblock boundary for luminance component and two samples of each side of macroblock boundary for chrominance component. Therefore, at least four line buffers are required for the luminance component and two line buffers are required for the chrominance component, respectively.

In the high efficiency video coding (HEVC) standard, a de-blocking filter may be implemented with picture-based processing, which needs a whole picture buffer to store pixel samples before in-loop filter process.

Hence, as the DF processes of the H.264 codec system and the DF process of the HEVC codec system have respective data buffer requirements, and the HEVC de-blocking filter may be implemented with picture-based processing, the production cost of a video codec chip which supports both of the H.264 standard and the HEVC standard would be very high.

SUMMARY

In accordance with exemplary embodiments of the present invention, a video processing system with shared/configurable in-loop filter data buffer architecture and related video processing method thereof are proposed to solve the above-mentioned problem.

According to a first aspect of the present invention, an exemplary video processing system is disclosed. The exemplary video processing system includes a data buffer and a storage controller. The data buffer is shared between a plurality of in-loop filters, wherein not all of the in-loop filters comply with a same video standard. The storage controller is arranged for controlling data access of the data buffer, wherein for each in-loop filter granted to access the data buffer, the data buffer stores a partial data of a picture processed by the in-loop filter.

According to a second aspect of the present invention, an exemplary video processing system is disclosed. The exemplary video processing system includes a storage device and a storage controller. The storage controller is arranged for adaptively determining a size of a storage space according to a tile partition setting of a picture to be processed by an in-loop filter, and controlling the storage device to allocate the storage space to serve as a data buffer for storing data of the in-loop filter.

According to a third aspect of the present invention, an exemplary video processing method is disclosed. The exemplary video processing method includes: sharing a data buffer between a plurality of in-loop filters, wherein not all of the in-loop filters comply with a same video standard; and controlling data access of the data buffer, wherein for each in-loop filter granted to access the data buffer, the data buffer stores a partial data of a picture processed by the in-loop filter.

According to a fourth aspect of the present invention, an exemplary video processing method is disclosed. The exemplary video processing method includes: adaptively determining a size of a storage space according to a tile partition setting of a picture to be processed by an in-loop filter; and controlling a storage device to allocate the storage space to serve as a data buffer for storing data of the in-loop filter.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
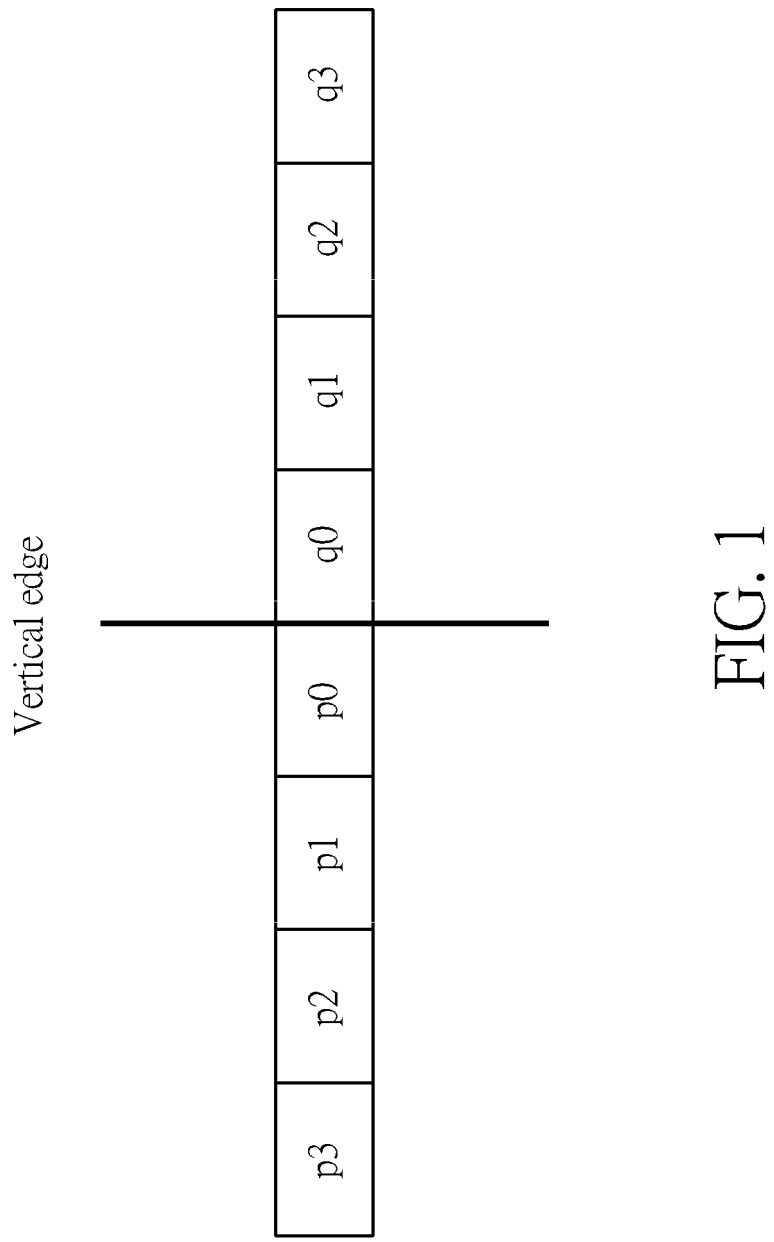
FIG. 1 is a diagram illustrating an HEVC DF process applied to a vertical edge of a CU block.

In the present invention, the HEVC de-blocking filter can be implemented with coding unit (CU) based processing instead of picture-based processing, thereby reducing the data buffer requirement. It should be noted that the CU-based DF process still needs to read and update the neighboring pixel samples of the current CU, and thus requires on-chip buffers for achieving real-time performance and external memory bandwidth reduction. In HEVC, the DF process is applied to a set of eight pixel samples across a CU block boundary (i.e., a horizontal edge or a vertical edge of a CU block). FIG. 1 is a diagram illustrating the HEVC DF process applied to a vertical edge of a CU block. As shown in FIG. 1, these pixel samples are denoted as p0-p3 and q0-q3 located on opposite sides of the vertical edge. With regard to the DF process of a luminance boundary, the DF process is invoked with eight pixel samples (i.e., luminance samples) p0-p3 and q0-q3 and at most three pixel samples of each side can be changed by the DF process. With regard to the DF process of a chrominance boundary, the DF process is invoked with two pixel samples (i.e., chrominance samples) p0-p1 and q0-q1 and one pixel sample of each side can be changed by the DF process. Therefore, in a CU-based DF process applied to the vertical edge, at least four vertical line buffers are required for the luminance component and two vertical line buffers are required for the chrominance component, respectively.

Figure 2:
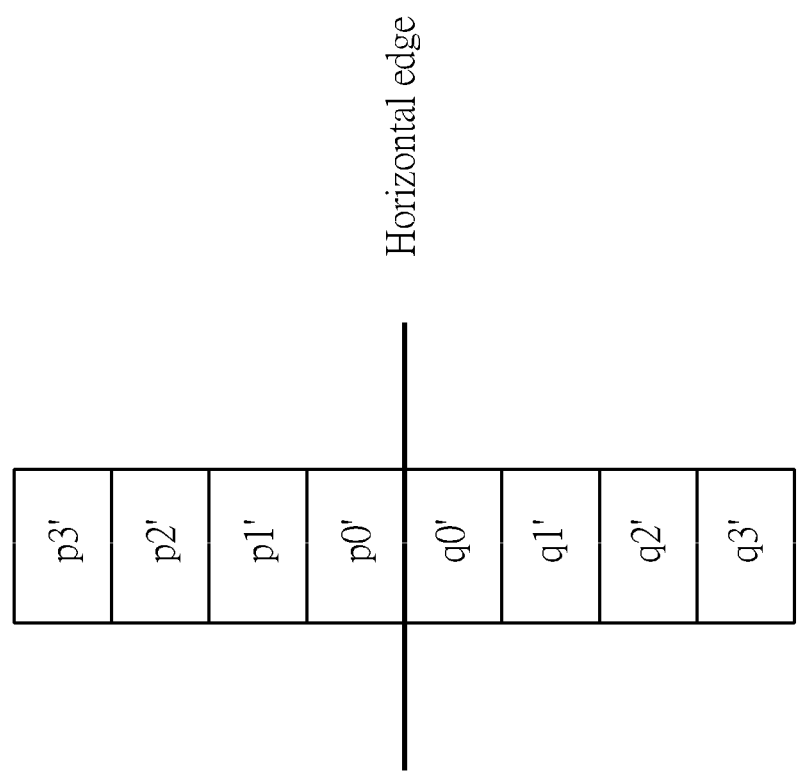
FIG. 2 is a diagram illustrating the HEVC DF process applied to a horizontal edge of a CU block.

FIG. 2 is a diagram illustrating the HEVC DF process applied to a horizontal edge of a CU block. As shown in FIG. 2, these pixel samples are denoted as p0'-p3' and q0'-q3' located on opposite sides of the horizontal edge. Similarly, with regard to the DF process of a luminance boundary, the DF process is invoked with eight pixel samples (i.e., luminance samples) p0'-p3' and q0'-q3' and at most three pixel samples of each side can be changed by the DF process. With regard to the DF process of a chrominance boundary, the DF process is invoked with two pixel samples (i.e., chrominance samples) p0'-p1' and q0'-q1' and one pixel sample of each side can be changed by the DF process. Therefore, in a CU-based DF process applied to the horizontal edge, at least four horizontal line buffers are required for the luminance component and two horizontal line buffers are required for the chrominance component, respectively.

As mentioned above, each of the macroblock (MB) based H.264 DF process and the CU-based HEVC DF process requires buffers for buffering pixel samples of an edge. Based on such an observation, the present invention therefore proposes shared buffer architecture for allowing an in-loop filter of one video coding standard (e.g., the HEVC de-blocking filter) to re-use at least a portion (i.e., part or all) of line buffers originally dedicated to an in-loop filter of another video coding standard (e.g., the H.264 de-blocking filter). Further details are described as below.

Figure 3:
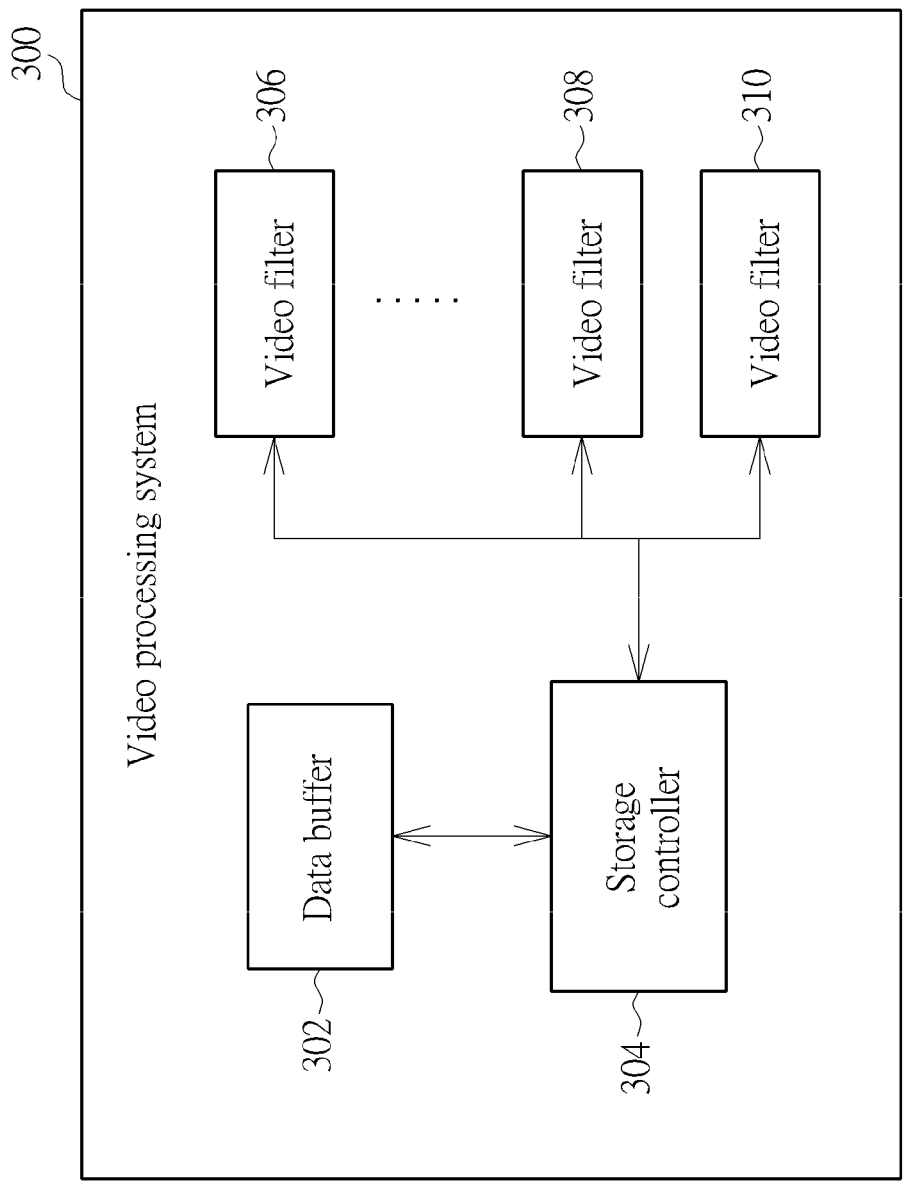
FIG. 3 is a block diagram illustrating a video processing system according to a first embodiment of the present invention.

FIG. 3 is a block diagram illustrating a video processing system according to a first embodiment of the present invention. The video processing system 300 may be part of a video codec system (e.g., a video codec chip). As shown in FIG. 3, the video processing system 300 includes a data buffer 302, a storage controller 304, and a plurality of video filters such as in-loop filters, wherein not all of the in-loop filters comply with the same video coding standard. In one exemplary design, the video filters may have at least one de-blocking filter of at least one video coding standard. For clarity and simplicity, only three video filters 306, 308 and 310 are illustrated in FIG. 3. In this embodiment, the data buffer 302 is shared between different video filters 306-310. The storage controller 304 is arranged for controlling data access of the data buffer 302. More specifically, the storage controller 304 is coupled between the data buffer 302 and the video filters 306-310, and controls whether one or more of the video filters 306-310 are allowed to access the data buffer 302.

For each of the in-loop filters (i.e., 306, 308 and 310) granted to access the data buffer 302, the data buffer 302 is used to store a partial data of a picture which is processed by the in-loop filter. Due to the scan order employed by the block-based processing of data blocks (e.g., macroblocks (MBs), largest coding units (LCUs), or super blocks) in a picture, the pixel data of a current data block (e.g., partial data of a picture which is processed by the in-loop filter) is required to be buffered in the data buffer 302 such that the pixel data of the current data block needed by the in-loop filter for processing a different data block later is available from the data buffer 302. For one example, pixel data of a first data block (e.g., partial data of a picture which is processed by the in-loop filter) stored into the data buffer 302 may be later used by horizontal-edge filtering/vertical-edge filtering that is performed on an edge between the first data block and a second data block when pixel data of the second data block is available. Take a normal picture without tile partition as an example, in order to achieve efficient block-based pipelined processing, it is required that MBs or LCUs in HEVC or super blocks in VP9 are processed in a raster scan order defined by H.264, HEVC and VP9 standards. When performing the horizontal-edge filtering, the in-loop filter processing may need the pixel data of two neighboring rows of MBs/LCUs/super blocks to finish the horizontal-edge filtering on an edge between the two neighboring rows. When a current row is being processed, the vertical-edge filtering is available because the in-loop filter processing may only need pixel data of the same row to perform the vertical-edge filtering, while the horizontal-edge filtering on an edge between the current row and the next row is not available. In this case, the in-loop filter processing can finish vertical-edge filtering of the current row without horizontal-edge filtering, and store the partially-finished pixel data (i.e., pixel data already processed by vertical-edge filtering but not processed by horizontal-edge filtering yet) into the data buffer, and then finish the horizontal-edge filtering in the next MB/LCU/super block row process. Please note that the above is for illustrative purposes only, and is not meant to be a limitation of the present invention.

By way of example, but not limitation, the video filter 306 may be an in-loop filter of a first video coding standard such as an H.264 de-blocking filter, and the video filters 308, 310 may be in-loop filters of a second video coding standard such as an HEVC de-blocking filter and an HEVC sample adaptive offset (SAO) filter. In an alternative design, the video filter 306 may be an in-loop filter of a first video coding standard such as an HEVC SAO filter, and one of the video filters 308, 310 may be an in-loop filter of a second video coding standard such as a VP9 de-blocking filter or VP9 second stage filter (for example a deringing filter).

In the following, it is assumed that the data buffer 302 is shared between an H.264 in-loop filter and HEVC in-loop filter(s). However, this is not meant to be a limitation of the present invention. That is, the same concept may be employed to sharing the data buffer 302 between an H.264 in-loop filter and VP9 in-loop filter(s), or sharing the data buffer 302 between an HEVC in-loop filter and a VP9 in-loop filter. More specifically, in one alternative design, the H.264 de-blocking filter mentioned below may remain intact, and the HEVC de-blocking filter and the HEVC SAO filter mentioned below may be replaced by a VP9 de-blocking filter and a VP9 deringing filter, respectively. In another alternative design, the H.264 de-blocking filter mentioned below may be replaced by an HEVC SAO filter, the HEVC de-blocking filter and the HEVC SAO filter mentioned below may be replaced by a VP9 in-loop filter (e.g., a VP9 de-blocking filter or a VP9 deringing filter). The same objective of sharing a data buffer between different in-loop filters is achieved.

Figure 13:
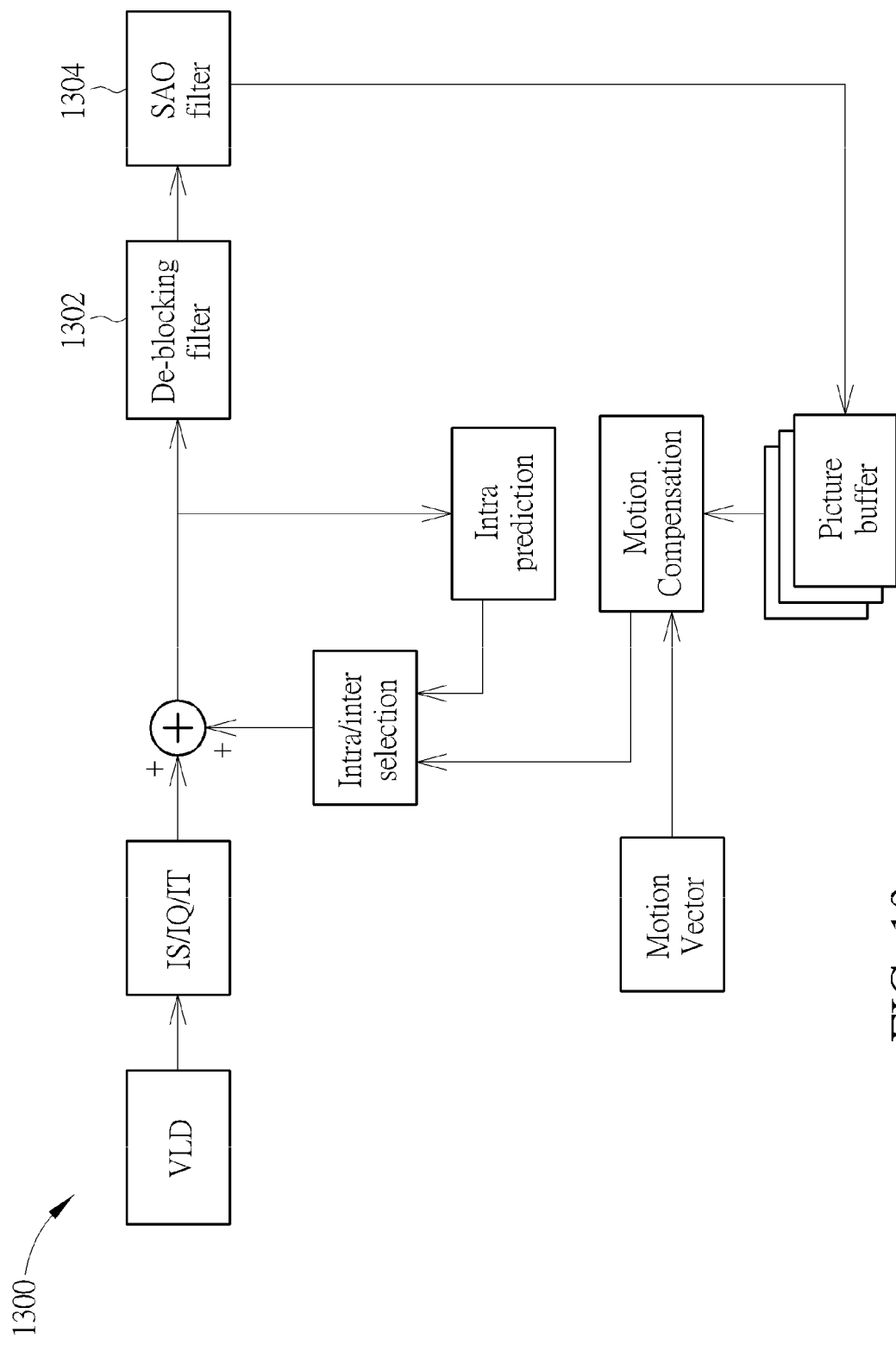
FIG. 13 is a diagram illustrating an exemplary structure of an HEVC decoder employing a de-blocking filter and an SAO filter as in-loop filters.

For illustrative purposes, an exemplary structure of an HEVC decoder 1300 employing a de-blocking filter 1302 and an SAO filter 1304 as in-loop filters is shown in FIG. 13. Besides de-blocking filter 1302 and SAO filter 1304, the HEVC decoder 1300 has other circuit blocks, including a variable length decoder (VLD), an inverse scan/inverse quantization/inverse transform (IS/IQ/IT) block, an intra prediction block, a motion compensation block, a picture buffer, etc. As a person skilled in the pertinent art should readily understand details of the HEVC decoder 1300, further description is omitted here for brevity.

In a case where the video filter 306 is an H.264 de-blocking filter, the MB-based DF process performed by the video filter 306 may use four line buffers for the luminance component and two line buffers for the chrominance component. When the H.264 de-blocking filter is configured to support the macroblock-adaptive frame/filed (MBAFF) structure, the number of line buffers will be doubled. In one exemplary design of the present invention, the data buffer 302 is designed to meet the buffer requirement of the H.264 de-blocking filter supporting the MBAFF structure.

In the HEVC standard, a picture can be divided into multiple tiles. The coding tree blocks in a tile are processed consecutively in a block raster scan order of the tile, and tiles in the picture are processed consecutively in a tile raster scan order of the picture. Besides, when the picture parameter set (PPS) syntax loop_filter_across_tiles_enabled_flag is set to 1, the DF operations are performed across tile boundaries. For example, pixel samples near the tile's left boundary are read and modified while the adjacent right tile partition enters. To reduce the access time of those pixel samples from an external memory (e.g., a dynamic random access memory (DRAM)) and external memory bandwidth, it can use an on-chip memory, such as a static random access memory (SRAM), as the vertical buffer for storing required pixel samples of the horizontal de-blocking filter applied to the vertical tile boundary.

Figure 4:
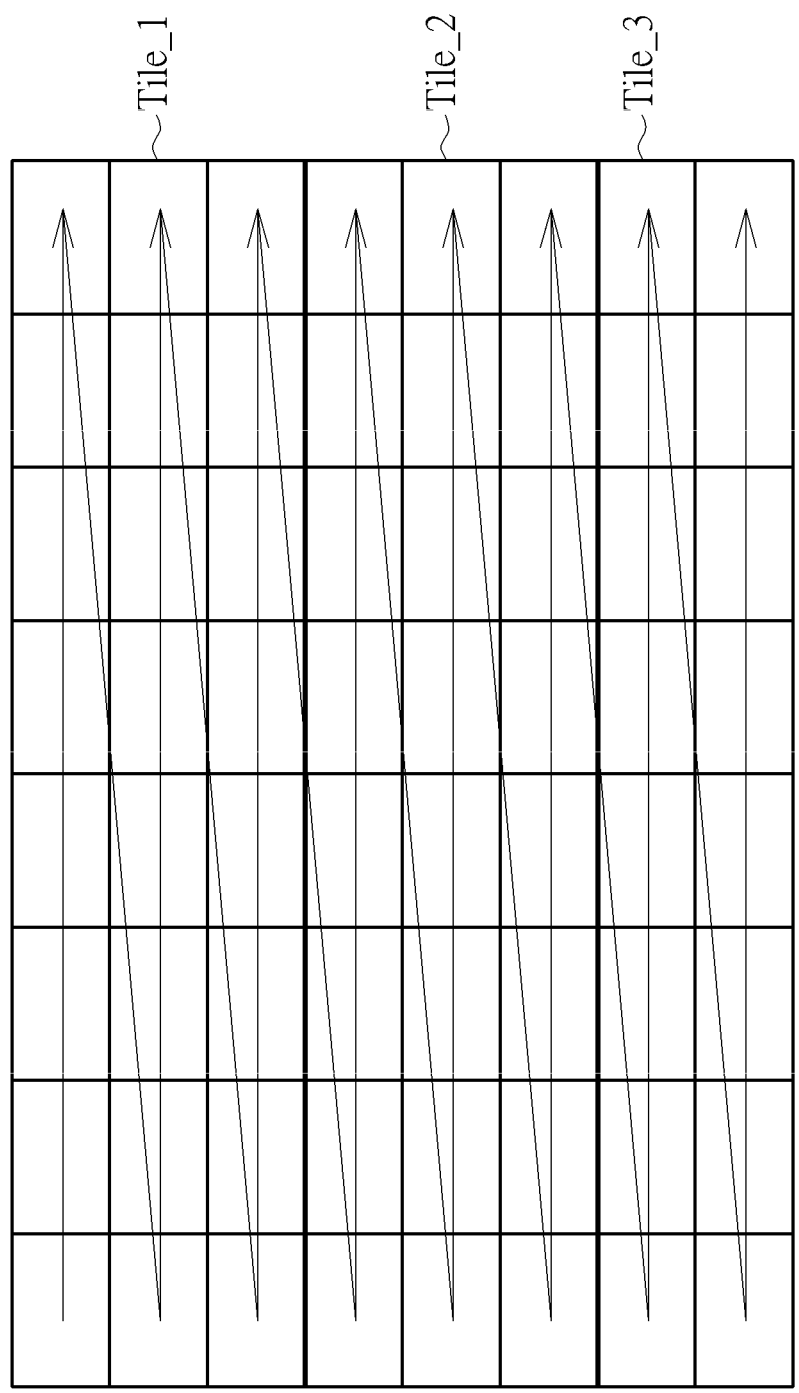
FIG. 4 is a diagram illustrating a first tile partition setting of a picture according to the HEVC standard.

FIG. 4 is a diagram illustrating a first tile partition setting of a picture according to the HEVC standard. In this example, the picture is a horizontally-divided tile picture composed of a plurality of tiles Tile_1, Tile_2 and Tile_3. The scan order of the blocks of the picture is represented by the arrow symbols. As only horizontal tile boundaries exist in the picture, the block scan order of the horizontally-divided tile picture is the same as that of a non-tile picture. Therefore, no vertical buffer is needed since the pixel samples on the left side of each vertical edge are immediately available due to the block scan order shown in FIG. 4. In this case, pixel data of a first data block (e.g., partial data of a picture which is processed by an in-loop filter) stored into the horizontal buffer may be later used by horizontal-edge filtering that is performed on a horizontal edge between the first data block and a second data block when pixel data of the second data block is available.

Figure 5:
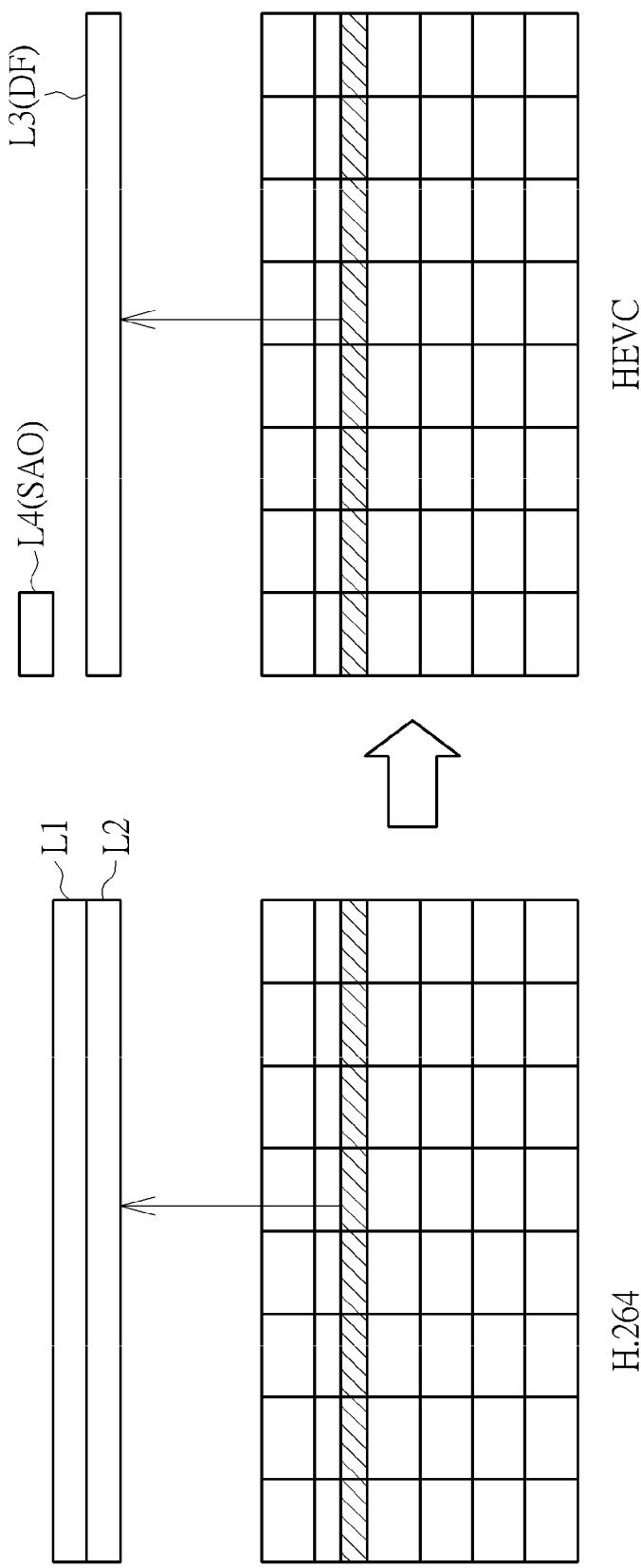
FIG. 5 is a diagram illustrating data buffer sharing between an H.264 in-loop filter and an HEVC in-loop filter according to an embodiment of the present invention.

FIG. 5 is a diagram illustrating data buffer sharing between an H.264 in-loop filter (e.g., an H.264 de-blocking filter) and HEVC in-loop filters (e.g., an HEVC de-blocking filter and/or an HEVC SAO filter) according to an embodiment of the present invention. The data buffer 302 includes a first line buffer L1 and a second line buffer L2. Both of the line buffers L1 and L2 are used by the H.264 de-blocking filter when the H.264 de-blocking filter supports the MABFF structure, and only one of the line buffers L1 and L2 is used by the H.264 de-blocking filter when the H.264 de-blocking filter does not support the MABFF structure. As mentioned above, the HEVC de-blocking filter only needs a horizontal buffer while performing the DF process upon the horizontally-divided tile picture. Thus, a portion of the data buffer 302 which includes the first line buffer L1 and the second line buffer L2 can be used to serve as the horizontal buffer L3 required by the HEVC de-blocking filter. More specifically, the video filter 306 (e.g., the H.264 de-blocking filter) is arranged to store a horizontal edge filter data (i.e., pixel data above the current macroblock) into the data buffer 302 when an access right of the data buffer 302 is granted to the H.264 de-blocking filter by the storage controller 304; and the video filter 308 (e.g., the HEVC de-blocking filter) is arranged to store a horizontal edge filter data (i.e., pixel data above the current CU block) into the data buffer 302 when the access right of the data buffer 302 is granted to the HEVC de-blocking filter by the storage controller 304.

Regarding the HEVC SAO filter, it has a buffer requirement generally lower than that of the HEVC de-blocking filter. As mentioned above, the HEVC de-blocking filter merely shares a portion of the first line buffer L1 and the second line buffer L2 originally allocated for the H.264 de-blocking filter. Thus, in this embodiment, another portion of the data buffer 302 (e.g., the remainder of the data buffer 302) can be used to serve as a horizontal buffer L4 required by the HEVC SAO filter. More specifically, the video filter 310 (e.g., the HEVC SAO filter) is arranged to store a horizontal neighbor data (i.e., pixel data above the current CU block) into the data buffer 302 when the access right of the data buffer 302 is also granted to the HEVC SAO filter by the storage controller 304.

Figure 6:
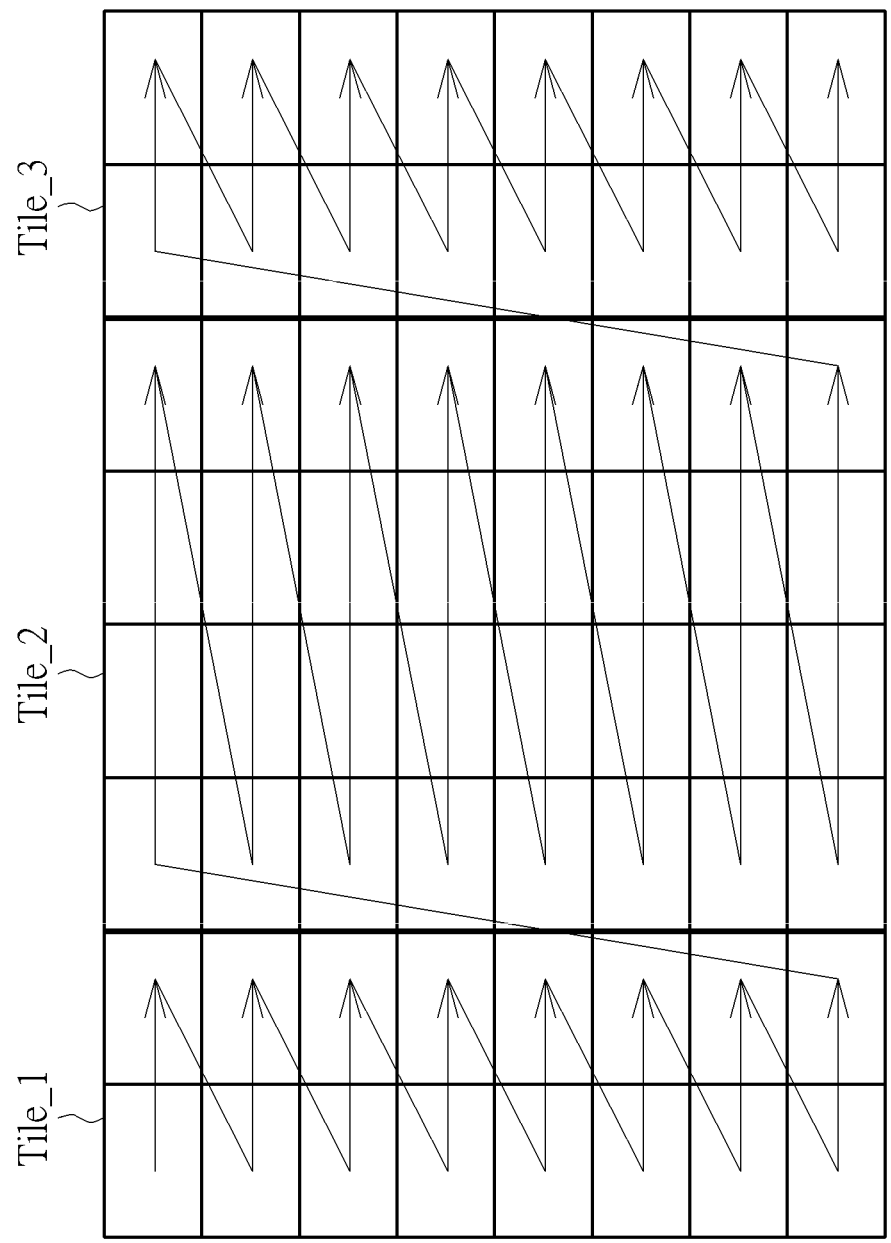
FIG. 6 is a diagram illustrating a second tile partition setting of a picture according to the HEVC standard.

FIG. 6 is a diagram illustrating a second tile partition setting of a picture according to the HEVC standard. In this embodiment, the picture is a vertically-divided tile picture composed of a plurality of tiles Tile_1, Tile_2 and Tile_3. The scan order of the blocks of the picture is represented by the arrow symbols. As the blocks on opposite sides of the vertical tile boundary are not processed consecutively. Thus, besides the horizontal buffer, the vertical buffer is needed. In this case, pixel data of a first data block (e.g., partial data of a picture which is processed by an in-loop filter) stored into the horizontal buffer may be later used by horizontal-edge filtering that is performed on a horizontal edge between the first data block and a second data block when pixel data of the second data block is available. In addition, pixel data of the first data block (e.g., partial data of the picture which is processed by the in-loop filter) stored into the vertical buffer may be later used by vertical-edge filtering that is performed on a vertical edge between the first data block and a third data block when pixel data of the third data block is available.

Figure 7:
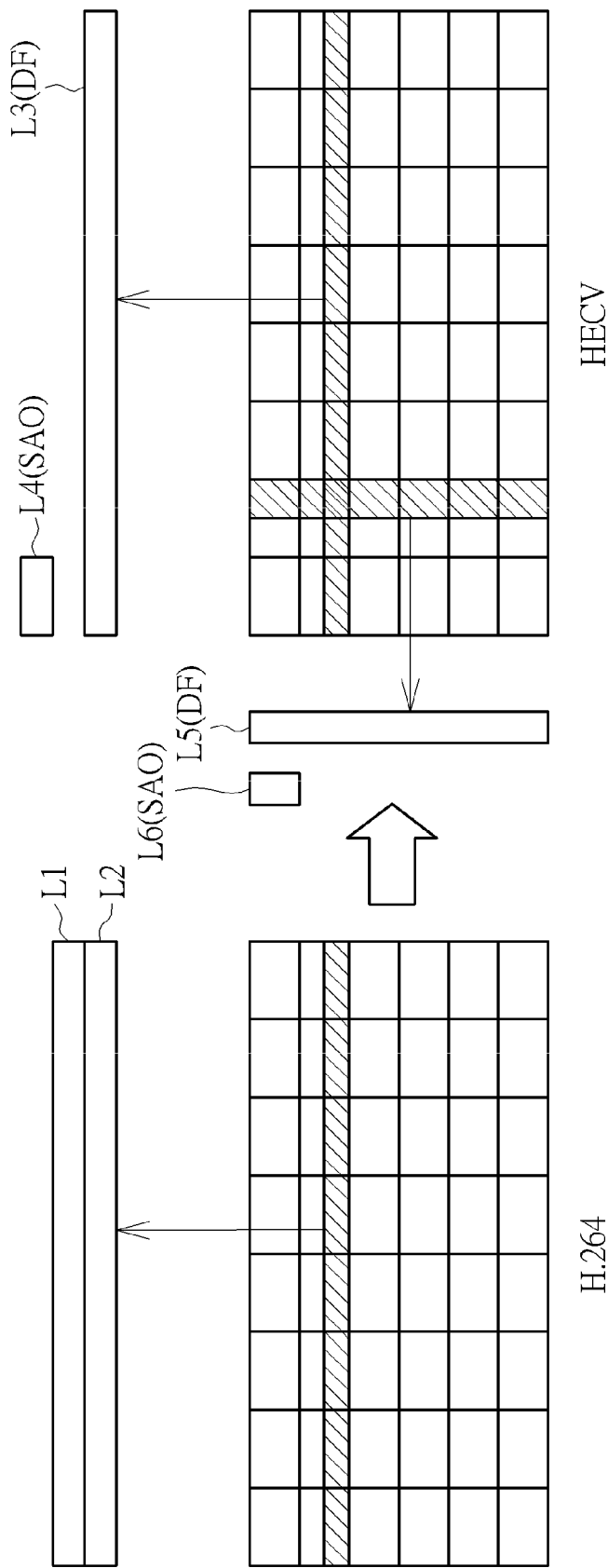
FIG. 7 is a diagram illustrating data buffer sharing between an H.264 in-loop filter and an HEVC in-loop filter according to another embodiment of the present invention.

FIG. 7 is a diagram illustrating data buffer sharing between an H.264 in-loop filter (e.g., an H.264 de-blocking filter) and HEVC in-loop filters (e.g., an HEVC de-blocking filter and/or an HEVC SAO filter) according to another embodiment of the present invention. The data buffer 302 includes a first line buffer L1 and a second line buffer L2. Both of the line buffers L1 and L2 are used by the H.264 de-blocking filter when the H.264 de-blocking filter supports the MABFF structure, and only one of the line buffers L1 and L2 is used by the H.264 de-blocking filter when the H.264 de-blocking filter does not support the MABFF structure. As mentioned above, the HEVC de-blocking filter needs a horizontal buffer as well as a vertical buffer while performing the DF process upon the vertically-divided tile picture. Thus, a portion of the data buffer 302 which includes the first line buffer L1 and the second line buffer L2 can be used to serve as the horizontal buffer L3 required by the HEVC de-blocking filter, and another portion of the data buffer 302 which includes the first line buffer L1 and the second line buffer L2 can be used to serve as the vertical buffer L5 required by the HEVC de-blocking filter. More specifically, the video filter 306 (e.g., the H.264 de-blocking filter) is arranged to store a horizontal edge filter data (i.e., the pixel data above the current macroblock) into the data buffer 302 when an access right of the data buffer 302 is granted to the H.264 de-blocking filter by the storage controller 304; and the video filter 308 (e.g., the HEVC de-blocking filter) is arranged to store a horizontal edge filter data (i.e., the pixel data above the current CU block) and a vertical edge filter data (i.e., the pixel data left to the current CU block) into the data buffer 302 when the access right of the data buffer 302 is granted to the HEVC de-blocking filter by the storage controller 304.

In general, the picture height is smaller than the picture width. That is, the vertical buffer L5 is generally smaller than the horizontal buffer L3. Hence, the HEVC de-blocking filter does not use all of the first line buffer L1 and the second line buffer L2 originally allocated for the H.264 de-blocking filter. Moreover, as mentioned above, the buffer requirement of the HEVC SAO filter is generally lower than that of the HEVC de-blocking filter. Thus, in this embodiment, yet another portion of the data buffer 302 (e.g., the remainder of the data buffer 302) can be used to serve as a horizontal buffer L4 and a vertical buffer L6 required by the HEVC SAO filter. More specifically, the video filter 310 (e.g., the HEVC SAO filter) is arranged to store a horizontal neighbor data (i.e., pixel data above a current block) and a vertical neighbor data (i.e., pixel data left to the current CU block) into the data buffer 302 when the access right of the data buffer 302 is also granted to the HEVC SAO filter by the storage controller 304.

Figure 8:
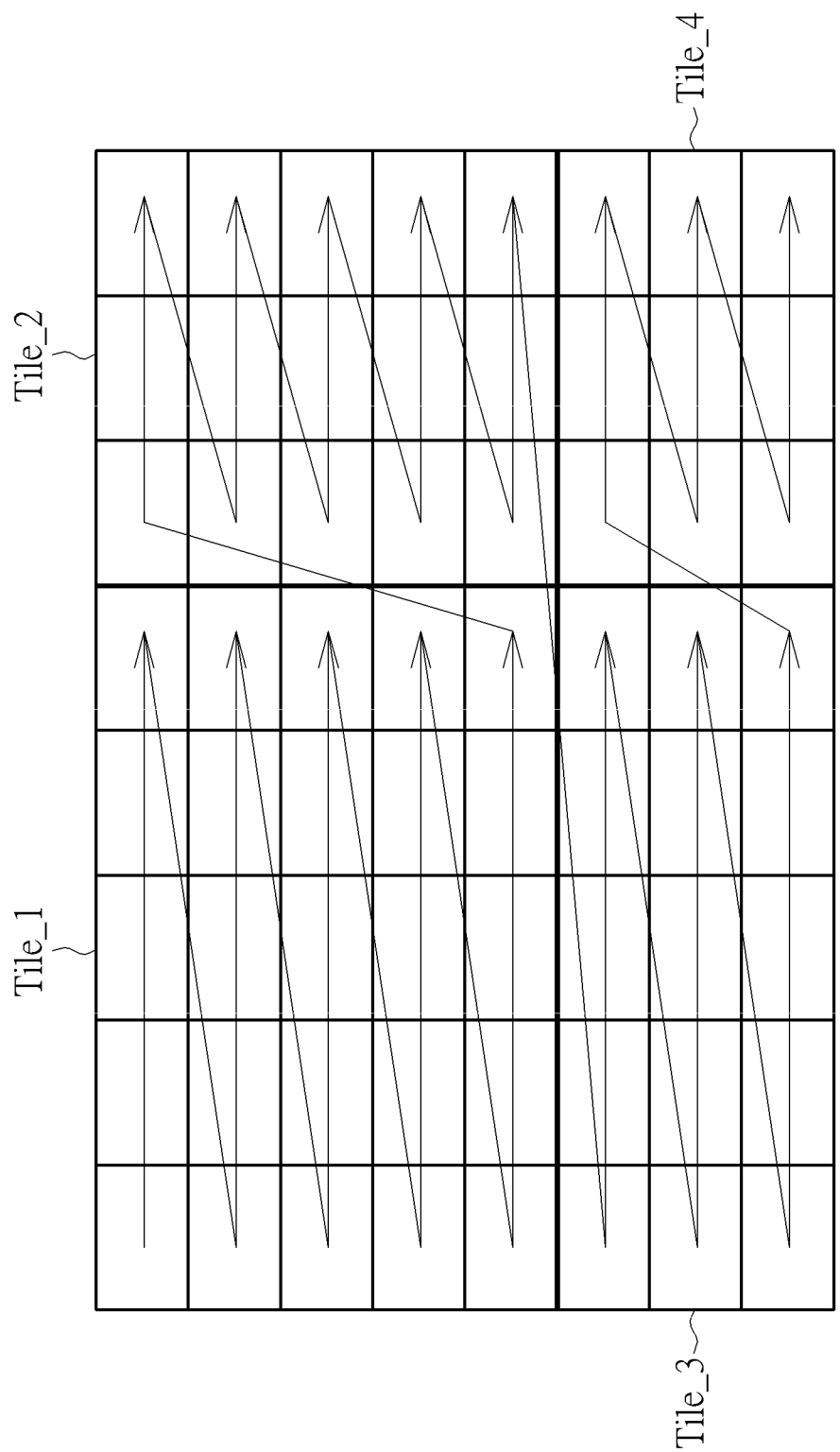
FIG. 8 is a diagram illustrating a third tile partition setting of a picture according to the HEVC standard.

FIG. 8 is a diagram illustrating a third tile partition setting of a picture according to the HEVC standard. In this embodiment, the picture is a two-dimensional tile picture composed of a plurality of tiles Tile_1, Tile_2, Tile_3 and Tile_4. The scan order of the blocks of the picture is represented by the arrow symbols. As the blocks on opposite sides of the vertical tile boundary are not processed consecutively. Thus, besides the horizontal buffer, the vertical buffer is needed. In this case, pixel data of a first data block (e.g., partial data of a picture which is processed by an in-loop filter) stored into the horizontal buffer may be later used by horizontal-edge filtering that is performed on a horizontal edge between the first data block and a second data block when pixel data of the second data block is available. In addition, pixel data of the first data block (e.g., partial data of the picture which is processed by the in-loop filter) stored into the vertical buffer may be later used by vertical-edge filtering that is performed on a vertical edge between the first data block and a third data block when pixel data of the third data block is available. Regarding the processing of the two-dimensional tile picture, the data buffer sharing scheme as shown in FIG. 7 can be employed. Further description is omitted here for brevity.

In each of the data buffer sharing schemes shown in FIG. 5 and FIG. 7, the line buffers originally allocated for an H.264 de-blocking filter are shared by different HEVC in-loop filters, including an HEVC de-blocking filter and an HEVC SAO filter. However, this is for illustrative purposes only, and is not meant to be a limitation of the present invention. For example, any video codec design having a data buffer shared between a de-blocking filter complying with a particular video coding standard (e.g., VC-1, RM or AVS) and any HEVC in-loop filter (e.g., the HEVC de-blocking filter and/or the HEVC SAO filter) falls within the scope of the present invention. More specifically, any video codec design having a data buffer shared between in-loop filter(s) complying with a first video coding standard and in-loop filter(s) complying with a second video coding standard different from the first video coding standard falls within the scope of the present invention.

Besides, with regard to the DF process applied to pixel samples across a block horizontal/vertical edge, the number of pixel samples processed by the de-blocking filter complying with the particular video coding standard is not required to be equal to the number of pixel samples processed by the HEVC de-blocking filter.

In one exemplary design, the size of the horizontal buffer L3 for the HEVC de-blocking filter, as shown in FIG. 5/FIG. 7, may correspond to the full picture width, and the vertical buffer L5 for the HEVC de-blocking filter, as shown in FIG. 7, may corresponding to the full picture height. However, as a picture may be divided into multiple tiles based on the HEVC standard, the present invention therefore proposes a dynamic storage allocation scheme for buffer reduction.

Figure 9:
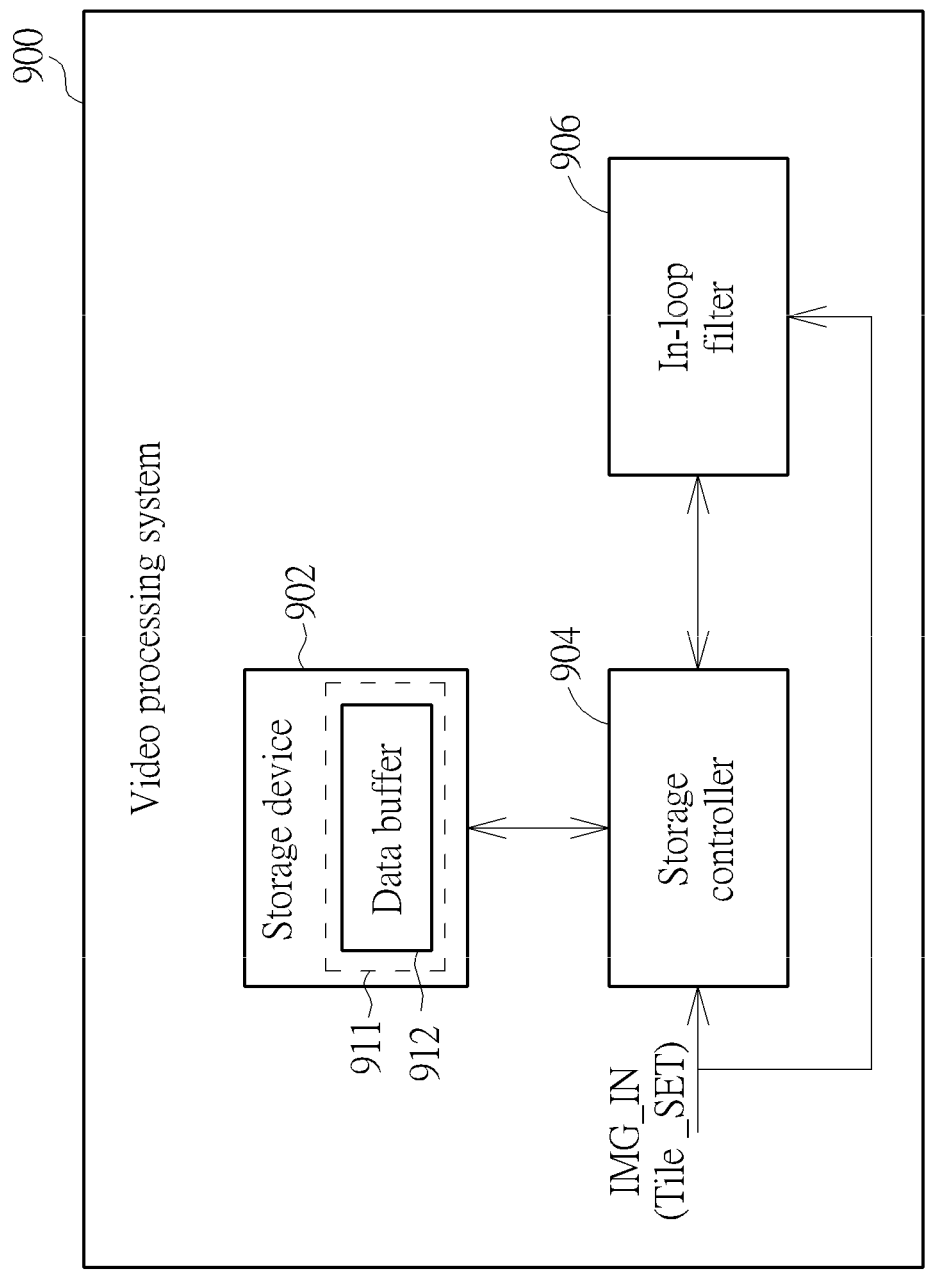
FIG. 9 is a block diagram illustrating a video processing system according to a second embodiment of the present invention.

Please refer to FIG. 9, which is a block diagram illustrating a video processing system according to a second embodiment of the present invention. The video processing system 900 may be part of a video codec system (e.g., a video codec chip). As shown in FIG. 9, the video processing system 900 includes a storage device 902, a storage controller 904 and an in-loop filter 906. By way of example, but not limitation, the in-loop filter 906 may be an HEVC in-loop filter (e.g., a de-blocking filter or an SAO filter) or a VP9 in-loop filter (e.g., a de-blocking filter or a second stage filter ((for example a deringing filter)), and the storage device 902 may be a volatile memory such as a DRAM. The storage controller 904 is coupled between the storage device 902 and the in-loop filter 906. The storage controller 904 is arranged for adaptively determining a size of a storage space 911 according to a tile partition setting Tile_SET of a picture IMG_IN to be processed by the in-loop filter 906, and controlling the storage device 902 to allocate the storage space 911 to serve as a data buffer 912 for storing data of the in-loop filter 906. In the following, it is assumed that the in-loop filter 906 is an HEVC de-blocking filter. However, this is for illustrative purposes only, and is not meant to be a limitation of the present invention. Based on the HEVC standard, the picture IMG_IN may be a horizontally-divided tile picture, a vertically-divided tile picture, or a two-dimensional tile picture. If a data buffer is allocated with a fixed size, the size of the data buffer should be the maximum among the buffer sizes defined in buffer requirements of the horizontally-divided tile picture, the vertically-divided tile picture, and the two-dimensional tile picture. As a result, the data buffer is fully utilized when the HEVC de-blocking filter is processing one of the horizontally-divided tile picture, the vertically-divided tile picture, and the two-dimensional tile picture, and is partially used when the HEVC de-blocking filter is processing another of the horizontally-divided tile picture, the vertically-divided tile picture, and the two-dimensional tile picture. Such a fixed storage allocation scheme lacks flexibility. In this embodiment of the present invention, the storage controller 904 adaptively configures the size of the data buffer 911 based on the tile partition setting Tile_SET. In other words, when the picture IMG_IN is a horizontally-divided tile picture, the data buffer 911 is configured to have a first buffer size; when the picture IMG_IN is a vertically-divided tile picture, the data buffer 911 is configured to have a second buffer size; and when the picture IMG_IN is a two-dimensional tile picture, the data buffer 911 is configured to have a third buffer size. As the size of the data buffer 912 will be dynamically adjusted, some of the storage space originally occupied by the data buffer 911 may be released and then used by other video processing circuits when the data buffer 911 is adjusted by the storage controller 904 to have a smaller buffer size. In this way, the utilization efficiency of the storage device 902 can be enhanced greatly, which improves the overall performance of the video codec system. For better understanding of the technical features of the proposed dynamic storage allocation scheme, several examples are provided as below.

Figure 10:
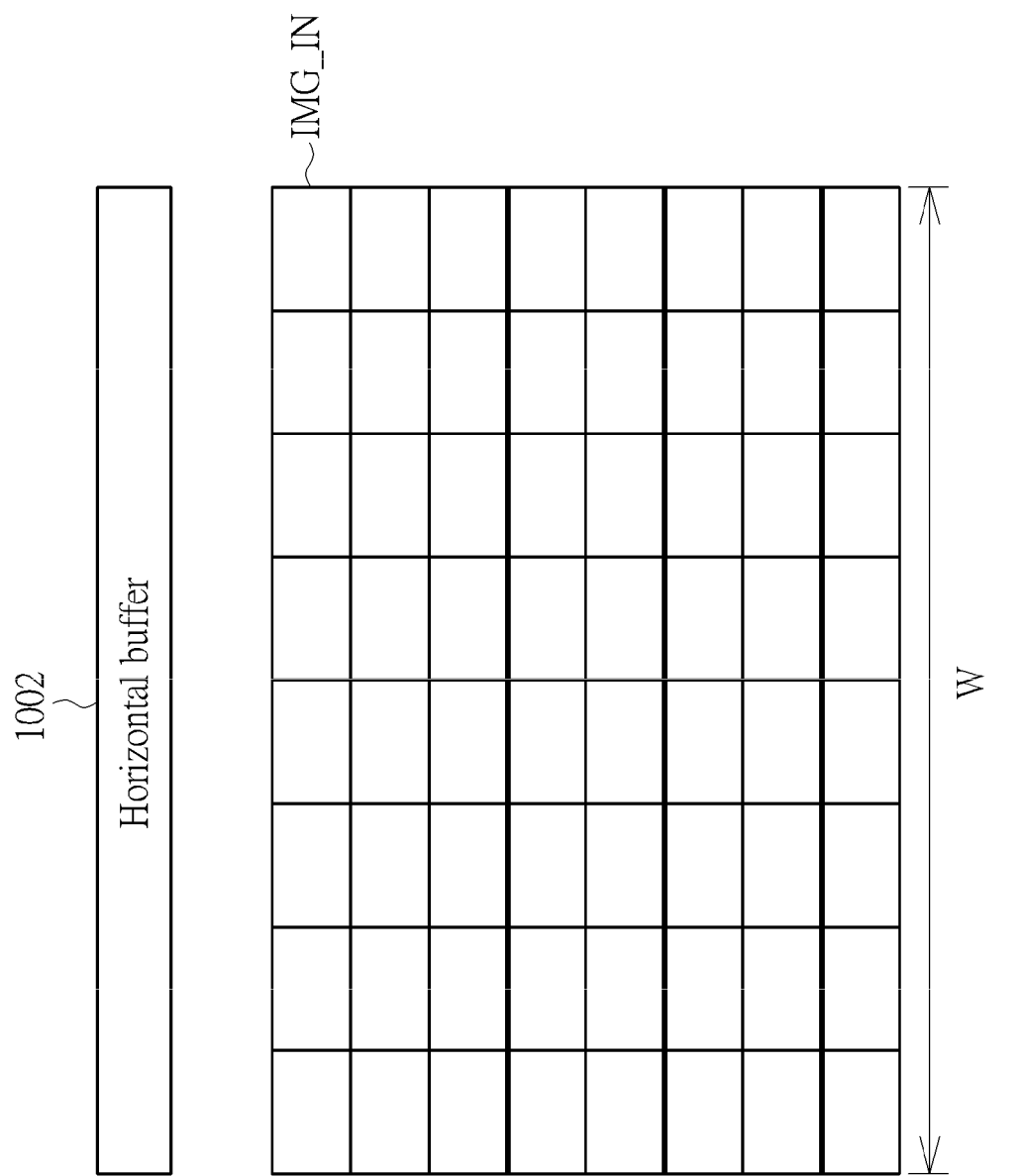
FIG. 10 is a diagram illustrating a first buffer allocation configured by the storage controller shown in FIG. 9.

FIG. 10 is a diagram illustrating a first buffer allocation configured by the storage controller 904 shown in FIG. 9. The storage controller 904 checks the tile partition setting Tile_SET, and acknowledges that the picture IMG_IN to be processed by the in-loop filter (e.g., the HEVC de-blocking filter) 906 is a horizontally-divided tile picture. As mentioned above, no vertical buffer is needed for applying the DF process to the horizontally-divided tile picture. Hence, the size of the storage space 911 is equal to a size of a horizontal buffer 1002, where the storage controller 904 determines the size of the horizontal buffer 1002 based on a width W of the horizontally-divided tile picture.

Figure 11:
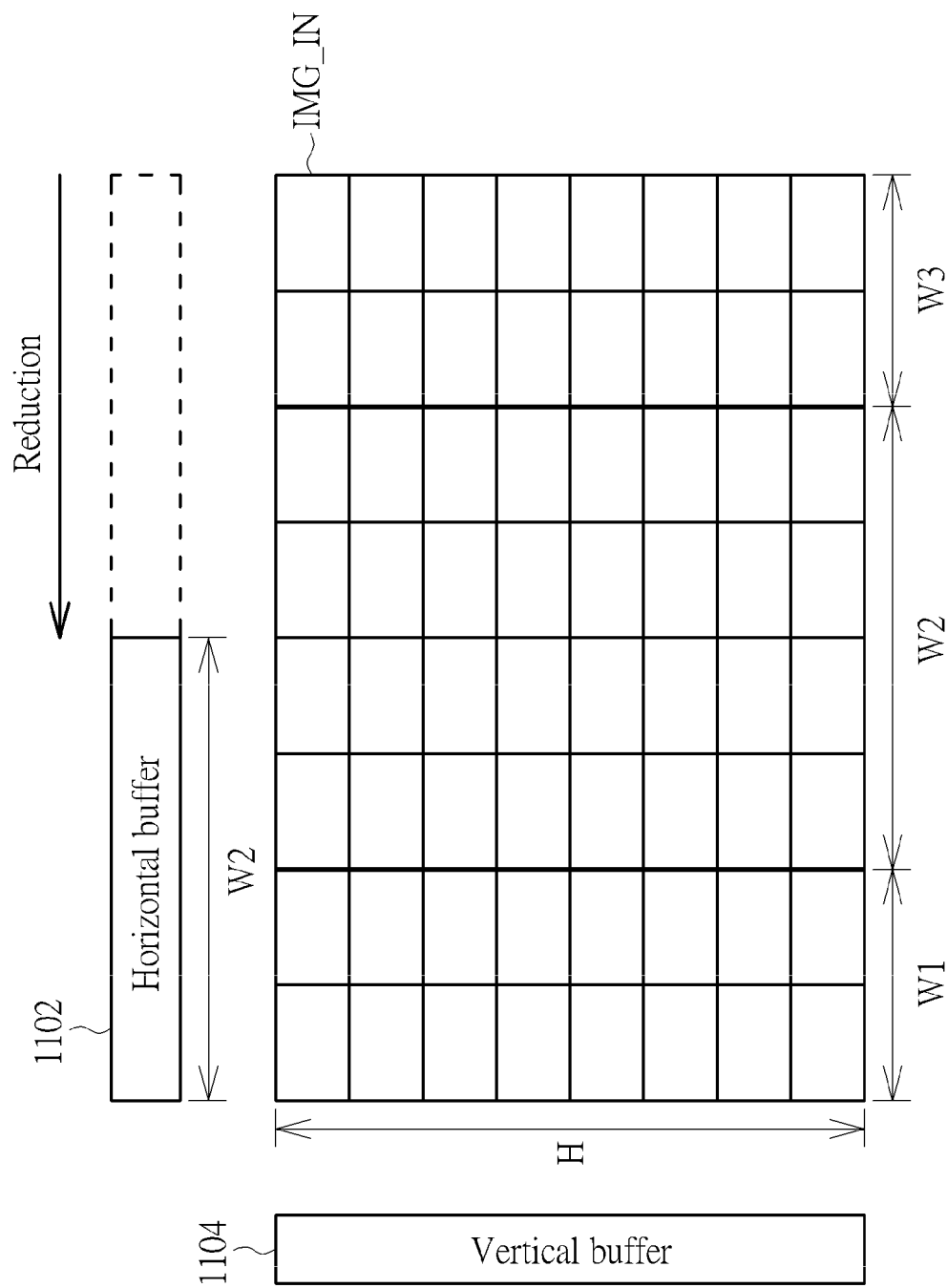
FIG. 11 is a diagram illustrating a second buffer allocation configured by the storage controller shown in FIG. 9.

FIG. 11 is a diagram illustrating a second buffer allocation configured by the storage controller 904 shown in FIG. 9. The storage controller 904 checks the tile partition setting Tile_SET, and acknowledges that the picture IMG_IN to be processed by the in-loop filter (e.g., the HEVC de-blocking filter) 906 is a vertically-divided tile picture. As mentioned above, a horizontal buffer (which is used for buffering pixel data above the current CU) and a vertical buffer (which is used for buffering pixel data left to the current CU) are both needed for applying the DF process to the vertically-divided tile picture. The size of the storage space 911 is equal to a size of a horizontal buffer 1102 and a size of a vertical buffer 1104, where the storage controller 904 determines the size of the horizontal buffer 1102 based on a maximum tile width of the vertically-divided tile picture, and determines the size of the vertical buffer 1104 based on a height H of the vertically-divided tile picture. As shown in FIG. 11, three tiles have respective tile widths W1, W2, and W3, respectively. As the tile width W2 is the maximum tile width, the size of the horizontal buffer 1102 is set according to the tile width W2. As can be readily known from FIG. 11, the horizontal buffer 1102 is capable of meeting the horizontal buffer requirements of the DF process applied to the tile with the tile width W1, the tile with the tile width W2, and the tile with the tile width W3. Compared to the horizontal buffer 1002 shown in FIG. 10, the horizontal buffer 1102 in FIG. 11 has a smaller size, thus achieving horizontal buffer reduction.

Figure 12:
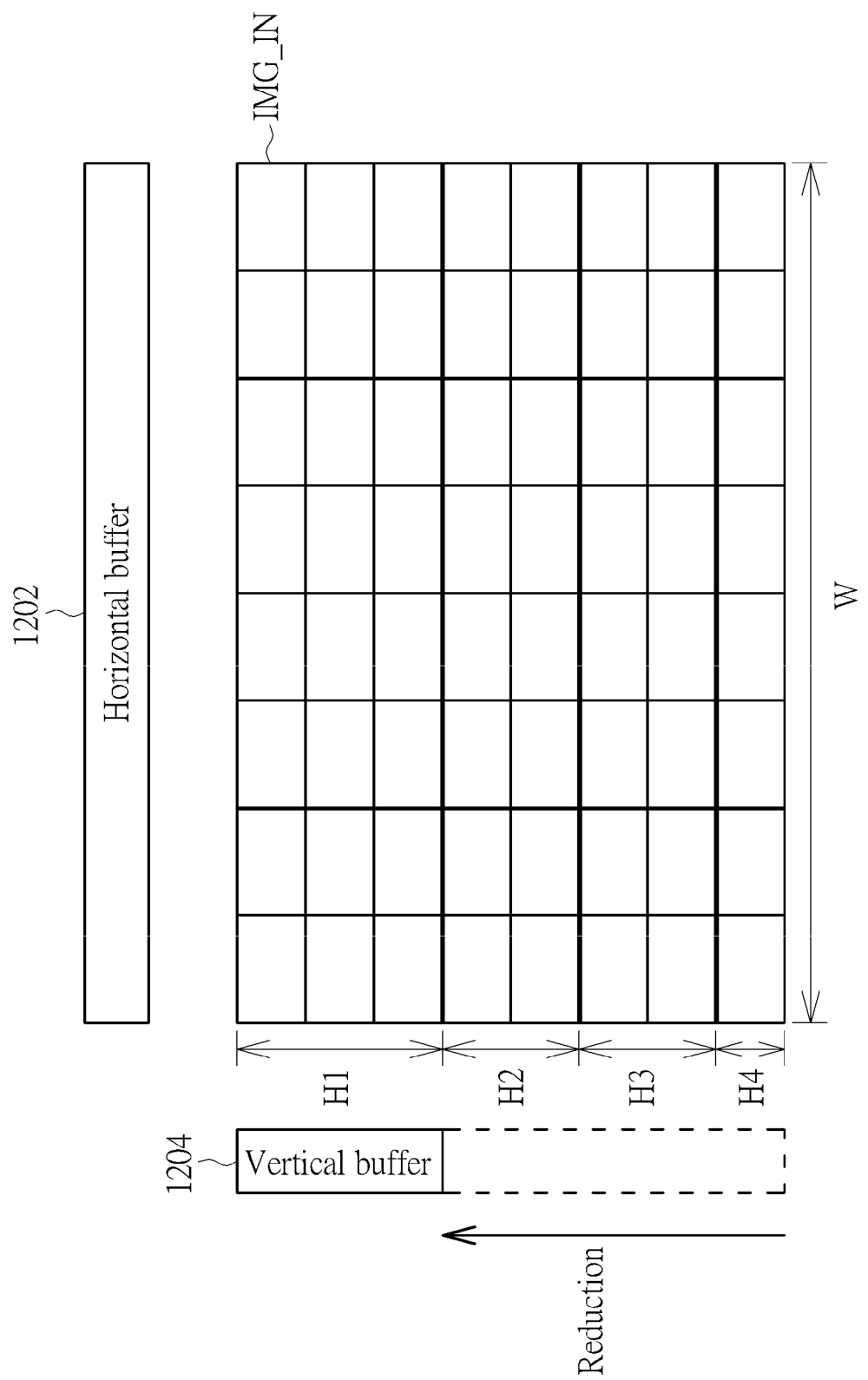
FIG. 12 is a diagram illustrating a third buffer allocation configured by the storage controller shown in FIG. 9.

FIG. 12 is a diagram illustrating a third buffer allocation configured by the storage controller 904 shown in FIG. 9. The storage controller 904 checks the tile partition setting Tile_SET, and acknowledges that the picture IMG_IN to be processed by the in-loop filter (e.g., the HEVC de-blocking filter) 906 is a two-dimensional tile picture. As mentioned above, a horizontal buffer (which is used for buffering pixel data above the current CU block) and the vertical buffer (which is used for buffering pixel data left to the current CU block) are both needed for applying the DF process to the two-dimensional tile picture. The size of the storage space 911 is equal to a size of a horizontal buffer 1202 and a size of a vertical buffer 1204, where the storage controller 904 determines the size of the vertical buffer 1204 based on a maximum tile height of the two-dimensional tile picture, and determines the size of the horizontal buffer 1202 based on a width W of the two-dimensional tile picture. As shown in FIG. 11, the tiles of the two-dimensional tile picture have different tile heights H1, H2, H3 and H4. As the tile height H1 is the maximum tile height, the size of the vertical buffer 1204 is set according to the tile height H1. As can be readily known from FIG. 12, the vertical buffer 1204 is capable of meeting the vertical buffer requirements of the DF process applied to the tiles with the tile height H1, the tiles with the tile height H2, the tiles with the tile height H3, and the tiles with the tile height H4. Compared to the vertical buffer 1104 shown in FIG. 11, the vertical buffer 1204 in FIG. 12 has a smaller size, thus achieving vertical buffer reduction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A video processing system, comprising:
a data buffer, shared between a plurality of in-loop filters, wherein not all of the in-loop filters comply with a same video standard; and
a storage controller, arranged for controlling data access of the data buffer, wherein for each in-loop filter granted to access the data buffer, the data buffer stores a partial data of a picture processed by the in-loop filter;
wherein at least one of the in-loop filters is arranged to store filter-related data into the data buffer when an access right of the data buffer is granted to said at least one of the in-loop filters by the storage controller.
2. The video processing system of claim 1, wherein the in-loop filters include at least one of an H.264 in-loop filter, a high efficiency video coding (HEVC) in-loop filter, and a VP9 in-loop filter.
3. The video processing system of claim 2, wherein the in-loop filters include the HEVC in-loop filter.
4. The video processing system of claim 3, wherein the in-loop filters further include an H.264 de-blocking filter.
5. The video processing system of claim 4, wherein said at least one of the in-loop filters comprises the HEVC in-loop filter and the H.264 de-blocking filter; the HEVC in-loop filter is an HEVC de-blocking filter; the H.264 de-blocking filter is arranged to store a horizontal edge filter data into the data buffer when the access right of the data buffer is granted to the H.264 de-blocking filter by the storage controller; and the HEVC de-blocking filter is arranged to store at least a horizontal edge filter data into the data buffer when the access right of the data buffer is granted to the HEVC de-blocking filter by the storage controller.
6. The video processing system of claim 5, wherein the HEVC de-blocking filter is further arranged to store a vertical edge filter data into the data buffer when the access right of the data buffer is granted to the HEVC de-blocking filter by the storage controller.

7. The video processing system of claim 4, wherein said at least one of the in-loop filters comprises the HEVC in-loop filter and the H.264 de-blocking filter; the HEVC in-loop filter is an HEVC sample adaptive offset (SAO) filter; the H.264 de-blocking filter is arranged to store a horizontal edge filter data into the data buffer when the access right of the data buffer is granted to the H.264 de-blocking filter by the storage controller; and the HEVC SAO filter is arranged to store at least a horizontal neighbor data into the data buffer when the access right of the data buffer is granted to the HEVC SAO filter by the storage controller.

8. The video processing system of claim 7, wherein the HEVC SAO filter is further arranged to store a vertical neighbor data into the data buffer when the access right of the data buffer is granted to the HEVC SAO filter by the storage controller.

9. The video processing system of claim 3, wherein the in-loop filters further include a VP9 in-loop filter.

10. The video processing system of claim 9, wherein said at least one of the in-loop filters comprises the HEVC in-loop filter and the VP9 in-loop filter; the VP9 in-loop filter is a VP9 de-blocking filter; the HEVC in-loop filter is arranged to store partial data of the picture processed by the HEVC in-loop filter into the data buffer when the access right of the data buffer is granted to the HEVC in-loop filter by the storage controller; and the VP9 de-blocking filter is arranged to store partial data of the picture processed by the VP9 de-blocking filter into the data buffer when the access right of the data buffer is granted to the VP9 de-blocking filter by the storage controller.

11. The video processing system of claim 9, wherein said at least one of the in-loop filters comprises the HEVC in-loop filter and the VP9 in-loop filter; the VP9 in-loop filter is a VP9 second stage filter; the HEVC in-loop filter is arranged to store partial data of the picture processed by the HEVC in-loop filter into the data buffer when the access right of the data buffer is granted to the HEVC in-loop filter by the storage controller; and the VP9 second stage filter is arranged to store partial data of the picture processed by the VP9 second stage filter when the access right of the data buffer is granted to the VP9 second stage filter by the storage controller.

12. A video processing method, comprising:
sharing a data buffer between a plurality of in-loop filters, wherein not all of the in-loop filters comply with a same video standard; and
controlling data access of the data buffer, wherein for each in-loop filter granted to access the data buffer, the data buffer stores a partial data of a picture processed by the in-loop filter;
wherein at least one of the in-loop filters stores filter-related data into the data buffer when an access right of the data buffer is granted to said at least one of the in-loop filters.

13. The video processing method of claim 12, wherein the in-loop filters include at least one of an H.264 in-loop filter, a high efficiency video coding (HEVC) in-loop filter, and a VP9 in-loop filter.

14. The video processing method of claim 13, wherein the in-loop filters include the HEVC in-loop filter.

15. The video processing method of claim 14, wherein the in-loop filters further include an H.264 de-blocking filter.

16. The video processing method of claim 15, wherein said at least one of the in-loop filters comprises the HEVC in-loop filter and the H.264 de-blocking filter; the HEVC in-loop filter is an HEVC de-blocking filter; the H.264 de-blocking filter stores a horizontal edge filter data into the data buffer when the access right of the data buffer is granted to the H.264 de-blocking filter; and the HEVC de-blocking filter stores at least a horizontal edge filter data into the data buffer when the access right of the data buffer is granted to HEVC de-blocking filter.

17. The video processing method of claim 16, wherein the HEVC de-blocking filter further stores a vertical edge filter data into the data buffer when the access right of the data buffer is granted to the HEVC de-blocking filter.

18. The video processing method of claim 15, wherein said at least one of the in-loop filters comprises the HEVC in-loop filter and the H.264 de-blocking filter; the HEVC in-loop filter is an HEVC sample adaptive offset (SAO) filter; the H.264 de-blocking filter stores a horizontal edge filter data into the data buffer when the access right of the data buffer is granted to the H.264 de-blocking filter; and the HEVC SAO filter stores at least a horizontal neighbor data into the data buffer when the access right of the data buffer is granted to the HEVC SAO filter.

19. The video processing method of claim 18, wherein the HEVC SAO filter further stores a vertical neighbor data into the data buffer when the access right of the data buffer is granted to the HEVC SAO filter.

20. The video processing method of claim 14, wherein the in-loop filters further include a VP9 in-loop filter.

21. The video processing method of claim 20, wherein said at least one of the in-loop filters comprises the HEVC in-loop filter and the VP9 in-loop filter; the VP9 in-loop filter is a VP9 de-blocking filter; the HEVC in-loop filter stores partial data of the picture processed by the HEVC in-loop filter into the data buffer when the access right of the data buffer is granted to the HEVC in-loop filter; and the VP9 de-blocking filter stores partial data of the picture processed by the VP9 de-blocking filter into the data buffer when the access right of the data buffer is granted to the VP9 de-blocking filter.

22. The video processing method of claim 20, wherein said at least one of the in-loop filters comprises the HEVC in-loop filter and the VP9 in-loop filter; the VP9 in-loop filter is a VP9 second stage filter; the HEVC in-loop filter stores partial data of the picture processed by the HEVC in-loop filter into the data buffer when the access right of the data buffer is granted to the HEVC in-loop filter; and the VP9second stage filter stores partial data of the picture processed by the VP9 second stage filter when the access right of the data buffer is granted to the VP9 second stage filter.

23. A video processing system, comprising:
a data buffer, shared between a plurality of in-loop filters, wherein not all of the in-loop filters comply with a same video standard; and
a storage controller, arranged for controlling data access of the data buffer, wherein for each in-loop filter granted to access the data buffer, the data buffer stores a partial data of a picture processed by the in-loop filter;
wherein the in-loop filters include a first in-loop filter and a second in-loop filter; the first in-loop filter is arranged to store a filter-related data into the data buffer when an access right of the data buffer is granted to the first in-loop filter by the storage controller; and the second in-loop filter is arranged to store at least a filter-related data into the data buffer when the access right of the data buffer is granted to the second in-loop filter by the storage controller.

24. A video processing method, comprising:
sharing a data buffer between a plurality of in-loop filters, wherein not all of the in-loop filters comply with a same video standard; and
controlling data access of the data buffer, wherein for each in-loop filter granted to access the data buffer, the data buffer stores a partial data of a picture processed by the in-loop filter;
wherein the in-loop filters include a first in-loop filter and a second in-loop filter; the first in-loop filter stores a filter-related data into the data buffer when an access right of the data buffer is granted to the first in-loop filter; and the second in-loop filter stores at least one filter-related data into the data buffer when the access right of the data buffer is granted to the second in-loop filter.

* * * * *